US012180808B2

United States Patent
Tian et al.

(10) Patent No.: US 12,180,808 B2
(45) Date of Patent: Dec. 31, 2024

(54) ALL-METAL INTELLIGENT CONTROL MOTOR

(71) Applicants: Southwest Petroleum University, Chengdu (CN); Nantong Xieming Technology Co., Ltd., Nantong (CN); Sichuan Xieming Technology Co., Ltd., Chengdu (CN)

(72) Inventors: Jialin Tian, Chengdu (CN); Junyang Song, Chengdu (CN); Lei Cha, Chengdu (CN); Heng Li, Chengdu (CN); Yanniu Ren, Chengdu (CN); Chunyu Xing, Chengdu (CN); Lin Yang, Chengdu (CN); Long Ran, Chengdu (CN)

(73) Assignees: Southwest Petroleum University, Chengdu (CN); Nantong Xieming Technology Co., Ltd., Nantong (CN); Sichuan Xieming Technology Co., Ltd., Chengdu (CN)

( * ) Notice: Subject to any disclaimer, the term of this patent is extended or adjusted under 35 U.S.C. 154(b) by 0 days.

(21) Appl. No.: 18/337,741

(22) Filed: Jun. 20, 2023

(65) Prior Publication Data
US 2024/0337158 A1  Oct. 10, 2024

(30) Foreign Application Priority Data

Apr. 10, 2023 (CN) .......................... 202310374442.1

(51) Int. Cl.
E21B 6/06     (2006.01)
E21B 4/00     (2006.01)
(Continued)

(52) U.S. Cl.
CPC ................ *E21B 4/04* (2013.01); *E21B 4/003* (2013.01); *E21B 4/006* (2013.01); *E21B 21/08* (2013.01); *E21B 44/005* (2013.01); *E21B 47/00* (2013.01)

(58) Field of Classification Search
CPC ....................................................... E21B 6/06
(Continued)

(56) References Cited

U.S. PATENT DOCUMENTS 3,807,512 A * 4/1974 Pogonowski ............. E21B 6/00
                                                                 175/107
6,315,063 B1 * 11/2001 Martini .................... E21B 4/00
                                                                 175/57

FOREIGN PATENT DOCUMENTS

CN        116624091 A *  8/2023

* cited by examiner

*Primary Examiner* — Kenneth L Thompson
(74) *Attorney, Agent, or Firm* — Andrew D. Fortney; Central California IP Group, P.C.

(57) ABSTRACT

The disclosure concerns oil drilling technology, and specifically an all-metal intelligent control motor (AMIM). The AMIM comprises an electric control module, a power module and a transmission module. The electric control module determines the axial position of the connecting rod valve through an electromagnet and controls the connection between the connecting rod valve and the piston through an electric motor. The hydraulic pressure of drilling fluid and the spring reaction force in the power module push a double worm to move axially and circumferentially under the action of internal teeth on the inner surface of shell. A one-way bearing ensures that the power module only transmits unidirectional motion. The transmission module axially limits the power module through TC bearings and transmits circumferential motion, drilling pressure and torque to the lower drilling tool. The AMIM is suitable for all kinds of (Continued)

deep well exploration, with a stronger drilling force, a lower cost and a higher applicability.

18 Claims, 5 Drawing Sheets

(51) Int. Cl.
*E21B 4/04* (2006.01)
*E21B 21/08* (2006.01)
*E21B 44/00* (2006.01)
*E21B 47/00* (2012.01)

(58) Field of Classification Search
USPC .............................................. 173/93.5, 93.6
See application file for complete search history.

ALL-METAL INTELLIGENT CONTROL MOTOR

TECHNICAL FIELD

The invention relates to the technical field of oil drilling, in particular to an all-metal intelligent control motor (AMIM).

BACKGROUND OF THE INVENTION

At present, most unproven oil is stored in deep and ultra-deep formations. However, deep and ultra-deep wells face many problems, such as more complex rock properties, increased exploration difficulties, low mechanical drilling speed, long drilling cycle, high drilling costs, more difficult drilling environment, and the power provided by the ground does not meet rock breaking requirements. Conventional downhole drilling motors have many limitations and inconveniences in deep and ultra-deep wells. So, highly adaptable, reliable, efficient and intelligent downhole drilling motors are necessary for further exploration.

SUMMARY OF THE INVENTION

The purpose of the present invention is to provide an all-metal intelligent control motor with high adaptability and efficiency.

To achieve the above-mentioned purpose, the technical solution in the present invention relates to an AMIM that comprises an electric control module, a power module, and a transmission module where the electric control module comprises an upper connecting sleeve, a connecting rod valve cover, a connecting rod valve, a signal output module, a lower connecting sleeve, a piston, and a signal input module, the power module comprises an upper thrust ball bearing, a dextrorotation worm, a dextrorotation transmission shaft, a lower thrust ball bearing, a levorotation worm, an upper string bearing, a shell, a cover, an upper one-way bearing, a lower one-way bearing, a connecting shaft, a one-way shaft, and a spring, and the transmission module comprises a transmission shaft shell, an upper tungsten carbide (TC) bearing moving ring, an upper moving ring alloy, an upper static ring alloy, an upper TC bearing static ring, a transmission shaft, a lower string bearing, a pressure sleeve, a half ring, a spacer sleeve, a lower TC bearing moving ring, a lower moving ring alloy, a lower static ring alloy and a lower TC bearing static ring; the components of the AMIM may share the same axis; the AMIM has detachable connections at opposite ends; the upper connecting sleeve includes a drilling fluid entry port, and the upper connecting sleeve, the lower connecting sleeve, the shell and the transmission shaft shell are connected in succession by taper threads; the connecting rod valve cover and the connecting rod valve are configured with a signal output module, and the signal output module is connected to a signal input module by wireless communication; the piston uses an electromagnet clamp to hold or release the connecting rod valve; the upper thrust ball bearing reduces, prevents or avoids rotation of the piston, and the dextrorotation worm is connected to the dextrorotation transmission shaft with a key joint; the lower thrust ball bearing is between the dextrorotation worm and the levorotation worm, and the upper string bearing is between the levorotation worm and the dextrorotation transmission shaft; the upper one-way bearing and the lower one-way bearing are between the levorotation worm, the dextrorotation transmission shaft and the transmission shaft; the connecting shaft is connected to the cover by screws to limit the axial position of the upper one-way bearing, and there are tabs inside the transmission shaft to separate the upper one-way bearing from the lower one-way bearing; the transmission shaft is splined to the one-way shaft, and a spring is in the inner cavity of the transmission shaft and the one-way shaft; the transmission shaft is threaded to the one-way shaft, and an end (e.g., a lower end) of the transmission shaft is connected to one or more downhole drilling tools; an upper TC bearing comprises or consists of the upper TC bearing moving ring, the upper moving ring alloy, the upper static ring alloy, and the upper TC bearing static ring; a lower TC bearing comprises or consists of the lower TC bearing moving ring, the lower moving ring alloy, the lower static ring alloy, and the lower TC bearing static ring; the upper TC bearing and the lower TC bearing are in a center of the lower string bearing, a pressure sleeve, a half ring, and a spacer sleeve; the pressure sleeve and the half ring can axially limit the axial position (e.g., of one or more structures in the AMIM) and transfer drilling pressure.

Preferably, the connecting rod valve and the connecting rod valve cover are configured with a signal output module, which may include a first control board, a Hall sensor, a first battery and a signal transmitter; the piston may include with a signal input module inside, which includes a second control board, a signal receiver, a second battery, a brushless motor, and a speed direction sensor.

Preferably, the piston comprises an outer ring and an inner ring. The outer ring of the piston is solid and the inner ring of the piston is hollow. The piston (or its inner ring) may include a signal input module. The signal input module transmits electrical signals to an electromagnet clamp through an internal channel of the piston.

Preferably, the upper connecting sleeve and the lower connecting sleeve have tabs inside, and the tabs are configured with a magnetic ring. The signal output module senses the signals of the magnetic ring of the upper connecting sleeve and the lower connecting sleeve through the Hall effect and transmits position signals to the signal input module wirelessly.

Preferably, the signal input module accepts the wireless communication signal from the signal output module, and controls the internal motor and the switching of the electromagnet according to the position of the linkage valve, thus controlling the holding and releasing of the electromagnet clamp.

Preferably, the piston and the shell are sealed with a seal. The shell has an inner surface that is treated, and may include a dextrorotation worm-shaped internal tooth and a levorotation worm-shaped internal tooth. The shell may have oil injection holes therein.

Preferably, in the above scheme, the transmission shaft is coaxial with the spring (e.g., at the lower end thereof), and the spring is preloaded.

Preferably, in the above scheme, the transmission shaft shell and the TC bearing in the transmission module are axially limited to the power module and can withstand the pressure of the upper drilling tool. The upper and lower TC bearings are axially limited to the transmission shaft shell and transmit the pressure and impact of the power module.

Compared with the existing technology, the present invention has the following beneficial effects:

1. The present invention provides a new AMIM with high adaptability and high reliability. Compared with the mainstream downhole power drilling tools at the present stage, it can produce impact-assisted rock breaking, and continuous rotation of the drill bit with the double worm gear.
2. All parts in the present invention can be made of high temperature resistant metal, which has high durability and resistance to loss. It can withstand large pressure and weight, and is not easily worn or damaged by long time use. It can drill deep wells and is not easy to fail in the complex and variable environment downhole, and is easy to operate without special training for operators.
3. The invention is ingeniously designed, low cost, and easier to maintain and repair than other types of drilling tools.

BRIEF DESCRIPTION OF THE DRAWINGS

FIG. 6 is a structure diagram of the one-way shaft.
Part Names in the Figures:
1—upper connecting sleeve; 2—connecting rod valve cover; 3—connecting rod valve, 301—connecting valve gate; 4—signal output module; 5—lower connecting sleeve; 6—piston; 7—signal input module; 8—upper thrust ball bearing; 9—dextrorotation worm; 10—dextrorotation transmission shaft; 11—lower thrust ball bearing; 12—levorotation worm; 13—upper string bearing; 14—shell, 1401—dextrorotation worm-shaped internal tooth, 1402—levorotation worm-shaped internal tooth; 15—cover; 16—upper one-way bearing; 17—lower one-way bearing; 18—connecting shaft; 19—one-way shaft, 1901—threaded hole, 1902—spline; 20—spring; 21—transmission shaft shell; 22—upper TC bearing moving ring; 23—upper moving ring alloy; 24—upper static ring alloy; 25—upper TC bearing static ring; 26—transmission shaft; 27; 27—lower string bearing; 28—pressure sleeve; 29—half ring; 30—spacer sleeve; 31—lower TC bearing moving ring; 32—lower moving ring alloy; 33—lower static ring alloy; 34—lower TC bearing static ring.

DETAILED DESCRIPTION OF THE INVENTION

Figure 1:
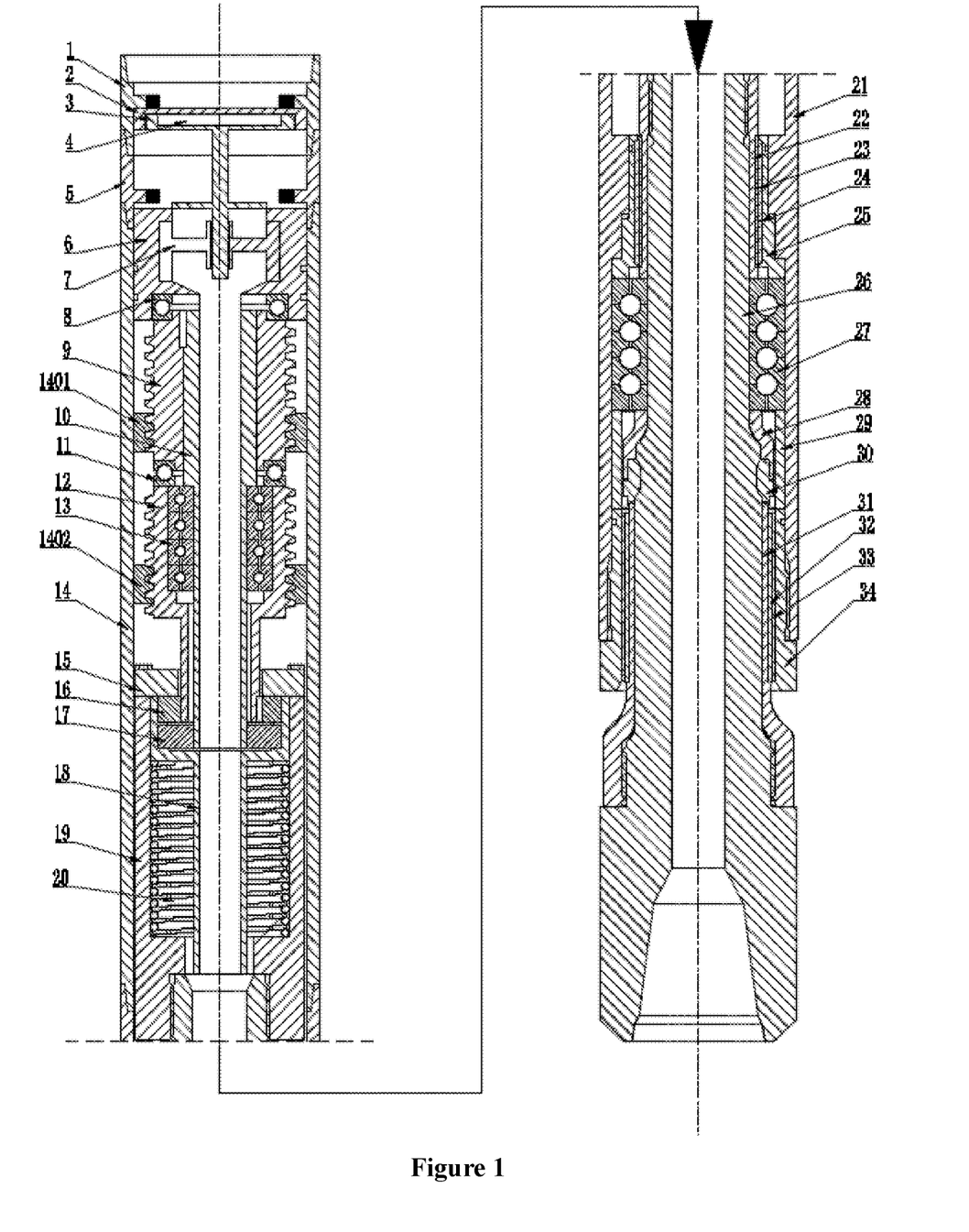
FIG. 1 is a structure diagram of the present invention.
Figure 2:
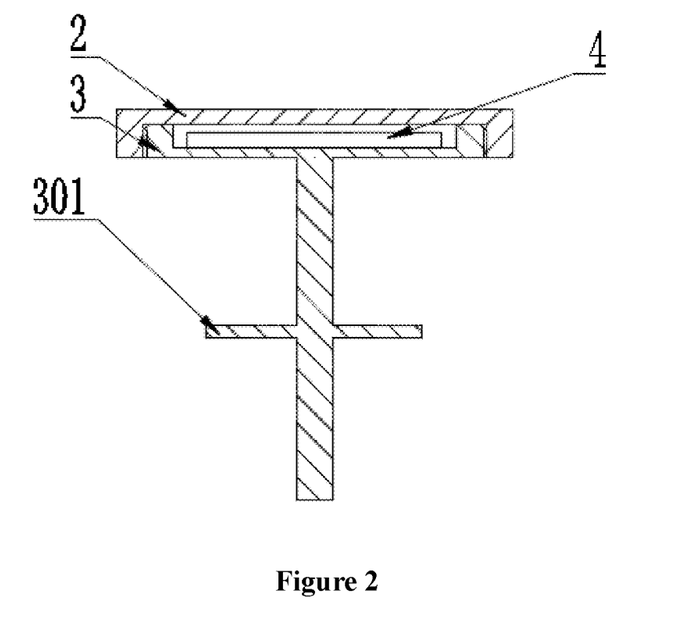
FIG. 2 is a structure diagram of the connecting rod valve.
Figure 3:
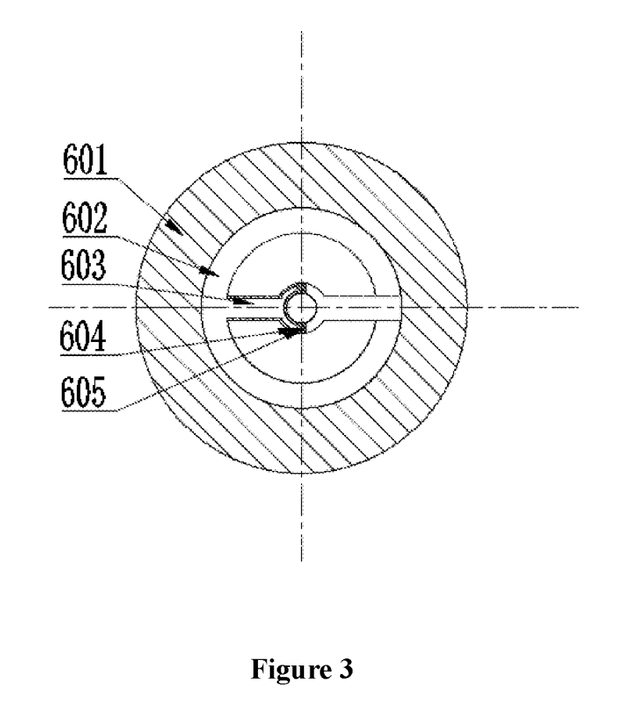
FIG. 3 is a structure diagram of the piston.
Figure 4:
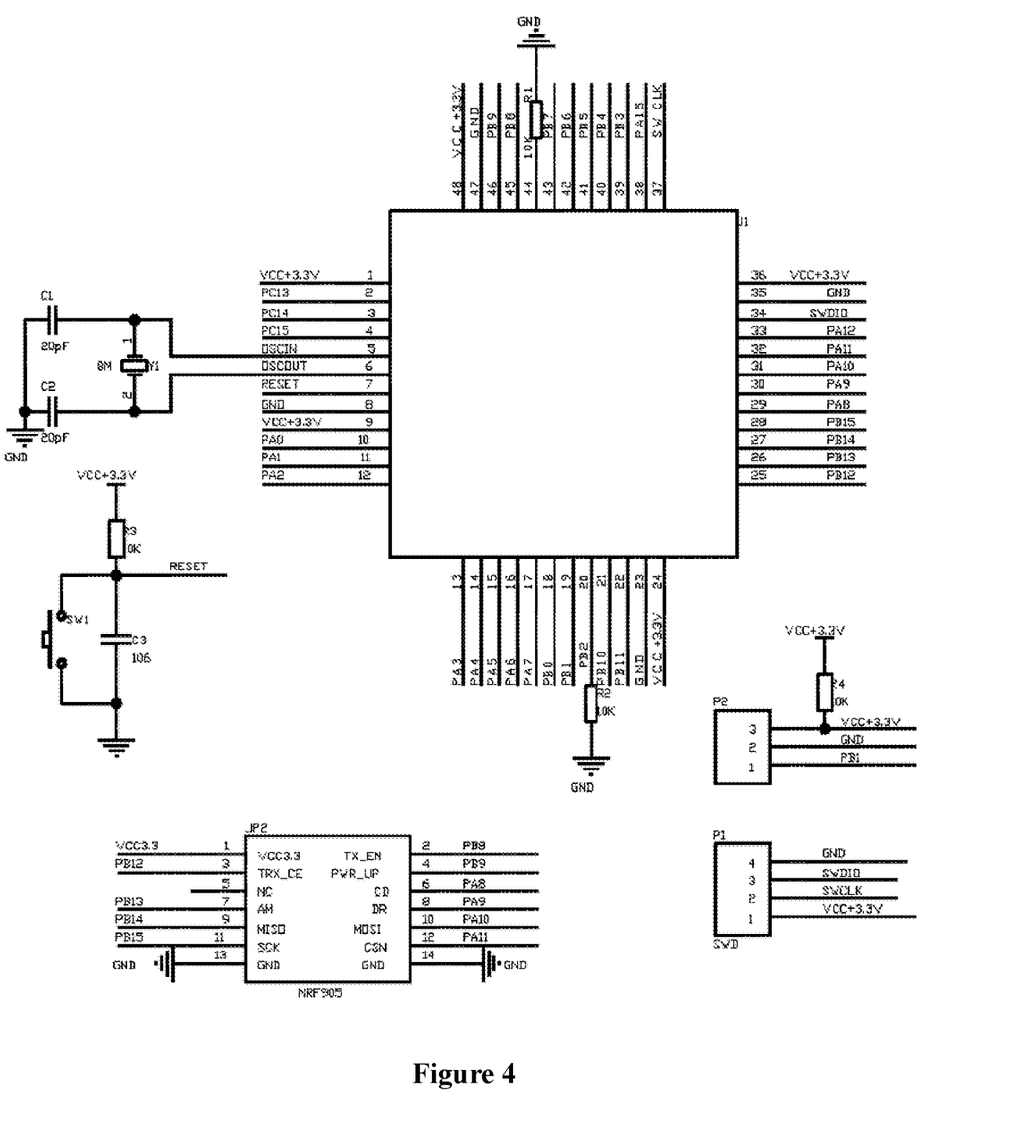
FIG. 4 is a circuit schematic diagram of the signal output module.
Figure 5:
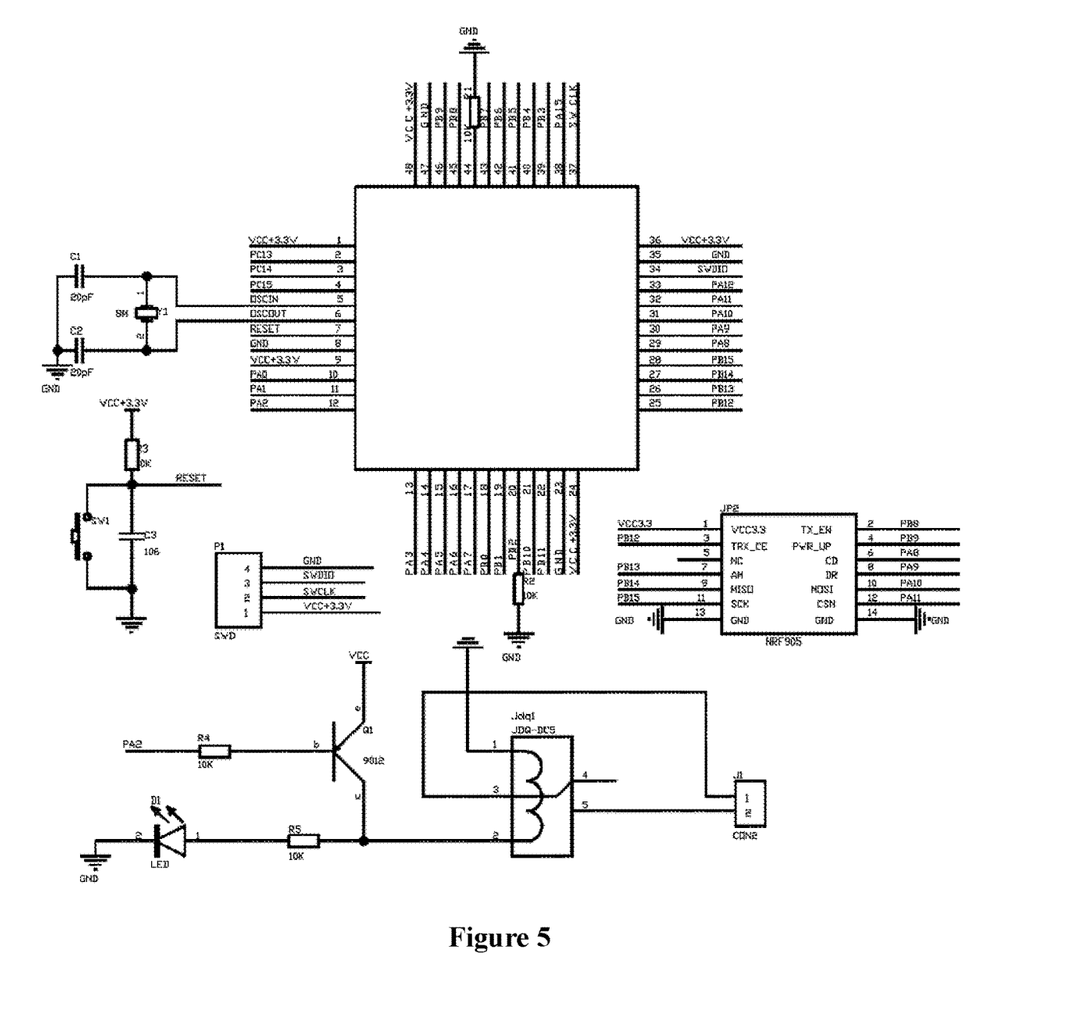
FIG. 5 is a circuit schematic diagram of the signal input module.

The present invention will be further described below in conjunction with the accompanying drawings:
An AMIM as shown in FIG. 1 can be used in a variety of situations where drilling is required; the present invention will be applied in oil drilling, not only limiting its application to this.
The AMIM, comprises an electric control module, a power module, and a transmission module, which in turn comprise: an upper connecting sleeve 1, a connecting rod valve cover 2, a connecting rod valve 3, a signal output module 4, a lower connecting sleeve 5, a piston 6, a signal input module 7, an upper thrust ball bearing 8, a dextrorotation worm 9, a dextrorotation transmission shaft 10, a lower thrust ball bearing 11, a levorotation worm 12, an upper string bearing 13, a shell 14, a cover 15, an upper one-way bearing 16, a lower one-way bearing 17, a connecting shaft 18, an one-way shaft 19, a spring 20, a transmission shaft shell 21, an upper TC bearing moving ring 22, an upper moving ring alloy 23, an upper static ring alloy 24, an upper TC bearing static ring 25, a transmission shaft 26, a lower string bearing 27, a pressure sleeve 28, a half ring 29, a spacer sleeve 30, a lower TC bearing moving ring 31, a lower moving ring alloy 32, a lower static ring alloy 33 and a lower TC bearing static ring 34. Each component of the AMIM may be coaxial Opposite ends of the AMIM may be detachably connected (e.g., to other drilling tools or parts of a drilling tool). The upper connecting sleeve 1 includes a drilling fluid input port, and the upper connecting sleeve 1 is connected to the lower connecting sleeve 5 with a taper thread, and the shell 14 and the transmission shaft shell 21 are connected in turn to the lower connecting sleeve 5 with taper threads to form the stator part of the whole tool. The connecting rod valve cover 2 and the connecting rod valve 3 include or are configured with the signal output module 4, and the signal output module 4 is connected to the signal input module 7 by wireless communication. The piston 6 has an electromagnet clamp to hold or release the connecting rod valve 3; the piston 6 is configured with the upper thrust ball bearing 8 to reduce, prevent, or avoid rotation (e.g., of the piston), and the dextrorotation worm 9 is connected to the dextrorotation transmission shaft 10 with a key joint. The lower thrust ball bearing 11 is between the dextrorotation worm 9 and the levorotation worm 12, and the upper string bearing 13 is between the levorotation worm 12 and the dextrorotation transmission shaft 10. The levorotation worm 12, the dextrorotation transmission shaft 10 and the connecting shaft 18 are connected with an upper one-way bearing 16 and the lower one-way bearing 17 respectively. The connecting shaft 18 is connected with the cover 15 by screws to restricting the axial position of the upper one-way bearing 16, with tabs inside connecting the shaft 18 separating the upper one-way bearing 16 and the lower one-way bearing 17. The connecting shaft 18 is splined to the one-way shaft 19, with the spring 20 in the inner cavity of the connecting shaft 18 and the one-way shaft 19. The transmission shaft 26 is threaded to the one-way shaft 19, with the lower end of the transmission shaft 26 connected to one or more downhole drilling tools. The upper TC bearing consists of the upper TC bearing moving ring 22, the upper moving ring alloy 23, the upper static ring alloy 24, and the upper TC bearing static ring 25. The lower TC bearing comprises or consists of the lower TC bearing moving ring 31, the lower moving ring alloy 32, the lower static ring alloy 33, and the lower TC bearing static ring 34. The upper TC bearing and the lower TC bearing are in the center of the lower string bearing 27, the pressure sleeve 28, the half ring 29 and the spacer sleeve 30. The pressure sleeve 28 and the half ring 29 can axially limit and transfer the drilling pressure.
As shown in FIGS. 1, 2 and 4, in the present AMIM, the connecting rod valve 3 and the connecting rod valve cover 2 are configured with the signal output module 4, which includes a control board, a Hall sensor, a battery and a signal transmitter; the rod valve gate 301 and the piston 6 cooperate to control the pressure of drilling fluid.
As shown in FIGS. 1, 3 and 5, in the present AMIM, the piston 6 includes a piston outer ring 601 and a piston inner ring 602; the piston outer ring 601 is solid, and the piston inner ring 602 is hollow, configured with the signal input module 7; the signal input module 7 includes a control board, a signal receiver, a battery with brushless motor and a speed direction sensor; the signal input module 7 transmits an electrical signal to the electromagnet 604 through the internal channel 603 of the piston to control the adsorption and rejection of the electromagnet 604 and the permanent magnet 605.

As shown in FIG. 1, in the present AMIM, the upper connecting sleeve 1 and the lower connecting sleeve 5 have tabs inside, and the tabs are configured with a magnetic ring inside; the signal output module 4 senses the signal of the magnetic ring of the upper connecting sleeve 1 and the lower connecting sleeve 5 through Hall effect, and transmits the position signal to the signal input module 7 wirelessly.

As shown in FIG. 1, in the present AMIM, the signal input module 7 accepts the wireless communication signal from the signal output module 4, controls the internal motor and controls the switch of the electromagnet 604 according to the position of the connecting rod valve 3, thus controlling the holding or releasing of the electromagnet clamps.

As shown in FIG. 1, in the present AMIM, the piston 6 and the shell 14 is sealed with a seal, the inner surface of shell 14 is surface treated, the inner surface of the shell 14 is configured with a dextrorotation worm-shaped internal tooth 1401 and a levorotation worm-shaped internal tooth 1402, which are configured with oil injection holes at the corresponding shell; the dextrorotation worm 9 rotates along the dextrorotation worm-shaped internal tooth 1401; the levorotation worm 12 rotates along the levorotation worm-shaped internal tooth 1402.

Figure 6:
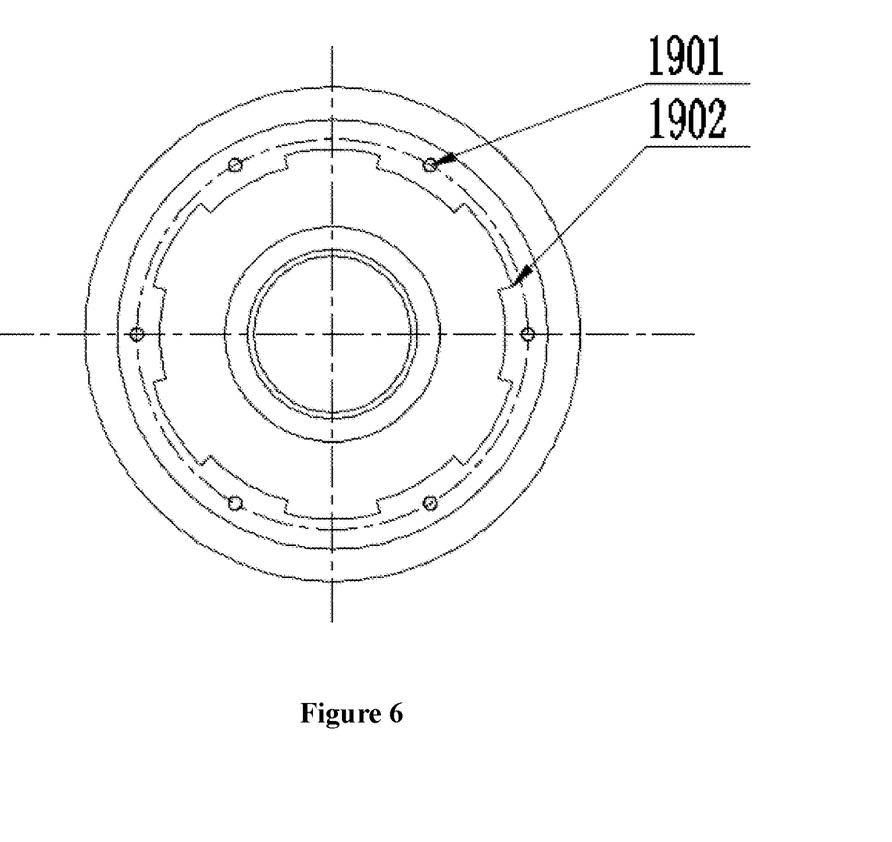

As shown in FIGS. 1 and 6, in the present AMIM, the connecting shaft 18 is coaxial with the spring 20, and the spring 20 is preloaded; the outer diameter of the connecting shaft 18 is smaller than the inner diameter of the lower transmission shaft 26, and the connecting shaft 18 can move axially inside the transmission shaft 26 without interfering with each other.

As shown in FIG. 1, in the present AMIM, the transmission shaft shell 21 in the transmission module and the TC bearings axially limit the power module, and can withstand the pressure of the upper drilling tool; the upper and lower TC bearings axially limit the transmission shaft shell 21, and transfer the pressure and impact of the power module.

The mechanical process of the described AMIM is described below with reference to the attached drawings.

Taking the state shown in FIG. 1 as the starting state, the connecting rod valve cover 2 is tightly attached to the tab of the upper connecting sleeve 1, and the electromagnet clamp in the piston 6 is tightly fastened to the connecting rod valve 3. When drilling fluid enters the tool from the upper connecting sleeve 1, as the connecting rod valve gate 301 blocks the valve hole of the piston 6, the drilling fluid holds pressure and pushes the connecting rod valve 3 and the piston 6 to move downward; the piston 6 pushes the dextrorotation worm 9 and the levorotation worm 12 to move downward spirally, and the dextrorotation worm 9 transmits the clockwise rotating motion to the connecting shaft 18, the one-way shaft 19 and the transmission shaft 26 through the dextrorotation transmission shaft 10 and lower the one-way bearing 17, and the counterclockwise rotation generated by the levorotation worm 12 will not be transmitted to the connecting shaft 18 because of the upper one-way bearing 16, so the transmission shaft 26 will transmit the clockwise rotation to the lower drilling tool; at the same time, the Hall effect sensor in the signal output module 4 senses the rotation of the upper connecting sleeve 1. At the same time, the Hall effect sensor in signal output module 4 senses the magnetic field strength of the upper connecting sleeve 1 and the lower connecting sleeve 5, and transmits the distance signal wirelessly to the signal input module 7, and the spring 20 is compressed.

When the lower end of the connecting rod valve 3 is forced to stop when it touches the tab of the lower connecting sleeve 5, the signal output module 4 transmits a wireless signal to the signal input module 7, which controls the electromagnet to disconnect, and the electromagnet clamp release the connecting rod valve 3; the drilling fluid is released through the valve hole of the piston 6, at the time the connecting rod valve 3 has no axial displacement, and the drilling fluid pressure is still greater than the reaction force of the spring 20.

After a period of pressure relief time, the connecting shaft 18 is moving in the opposite direction, pushing the dextrorotation worm 9, the levorotation worm 12 and the piston 6 upward spirally; at the same time, the speed sensor in the signal input module 7 senses the speed change direction, controls the electromagnet energized, then the electromagnet clamp holds the connecting rod valve 3; the piston 6 and the connecting rod valve 3 synchronously move upward, the levorotation worm 12 will transmit clockwise rotational movement to the connecting shaft 18, the one-way shaft 19 and the transmission shaft through the upper one-way bearing 16; the counterclockwise rotation generated by the dextrorotation worm 9 and the dextrorotation transmission shaft 10 will not be transmitted to the connecting shaft 18 because of the lower one-way bearing 17, so the transmission shaft 26 will transmit the clockwise rotation to the lower drilling tool; at the same time, the Hall effect sensor in the signal output module 4 senses the magnetic field strength of the upper connecting sleeve 1 and the lower connecting sleeve 5, and transmits the distance signal to the signal input module 7 wirelessly; at the same time, the Hall-effect sensor in the signal output module 4 senses the magnetic field strength of the upper connecting sleeve 1 and the lower connecting sleeve 5 and transmits the distance signal to the signal input module 7 wirelessly, and the spring 20 gradually extends.

When the connecting rod valve cover 2 moves to contact the tab of the upper connecting sleeve 1, it is forced to stop; the signal output module 4 transmits wireless signals to the signal input module 7, the signal input module 7 controls the electromagnet power off, and the electromagnet clamp releases the connecting rod valve 3; the valve hole of the piston 6 is in the open state, the reaction force of the spring 20 is greater than the drilling fluid pressure, the piston 6 move upward axially, the connecting rod valve 3 has no axial displacement, until the connecting rod valve gate 301 is close to the piston 6, the whole tool is back to the state as shown in FIG. 1, and the drilling fluid cannot pass, holding pressure again, and repeating or recycling, etc.

The above content is merely an example to describe the structure of the present invention. Technical personnel in the technical field can make various modifications or additions to the specific embodiments described or use similar methods to replace them, as long as such modifications or additions do not deviate from the structure of the invention or go beyond the present invention, they shall all fall into the protection scope of the present invention defined by the claims of the invention.

What is claimed is:

1. An all-metal intelligent control motor (AMIM), comprising:
    an electric control module which includes an upper connecting sleeve, a connecting rod valve cover, a connecting rod valve, a signal output module, a lower connecting sleeve, a piston, and a signal input module;
    a power module which includes an upper thrust ball bearing, a dextrorotation worm, a dextrorotation transmission shaft, a lower thrust ball bearing, a levorotation worm, an upper string bearing, a shell, a cover, an upper one-way bearing, a lower one-way bearing, a connecting shaft, a one-way shaft, and a spring; and a transmission module which includes a transmission shaft shell, an upper TC bearing comprising an upper tungsten carbide (TC) bearing moving ring, an upper moving ring alloy, an upper static ring alloy, and an upper TC bearing static ring, a transmission shaft, a lower string bearing, a pressure sleeve, a half ring, a spacer sleeve, and a lower TC bearing comprising a lower string moving ring, a lower moving ring alloy, a lower static ring alloy, and a lower TC bearing static ring;

wherein the upper connecting sleeve, the lower connecting sleeve, the shell, and the transmission shaft shell are connected in succession by taper threads; the connecting rod valve and the piston are axially limited; the upper thrust ball bearing is between the piston and the dextrorotation worm, and the dextrorotation worm and the dextrorotation transmission shaft are connected; the dextrorotation worm and the levorotation worm are configured with the lower thrust ball bearing; the levorotation worm and the dextrorotation transmission shaft are configured with the upper string bearing; the levorotation worm, the dextrorotation transmission shaft and the connection shaft are respectively welded with the upper one-way bearing and the lower one-way bearing; the connecting shaft separates the upper one-way bearing and the lower one-way bearing; the connecting shaft is splined to the one-way shaft, and the spring is in an inner cavity of the connecting shaft and the one-way shaft; the transmission shaft is threaded to the one-way shaft; and the upper TC bearing and the lower TC bearing are in a center of the lower string bearing, the pressure sleeve, the half-ring and the spacer sleeve.

2. The AMIM according to claim 1, wherein each of the electric control module, the power module and the transmission module is coaxial.

3. The AMIM according to claim 1, wherein the signal output module is in the connecting rod valve and the connecting rod valve cover.

4. The AMIM according to claim 1, wherein the signal output module includes a first control board, a Hall sensor, a first battery and a signal transmitter.

5. The AMIM according to claim 1, wherein the signal input module is in the piston.

6. The AMIM according to claim 1, wherein the signal input module includes a second control board, a signal receiver, a second battery, and a speed direction sensor.

7. The AMIM according to claim 1, further comprising a connecting rod valve gate that cooperates with the piston to control a pressure of a drilling fluid.

8. The AMIM according to claim 1, wherein the piston includes an outer ring and an inner ring; the outer ring is solid, and the inner ring is hollow.

9. The AMIM according to claim 1, wherein the signal input module transmits electrical signals to an electromagnet through an internal channel of the piston.

10. The AMIM according to claim 1, wherein the signal output module senses a magnetic signal of the upper connecting sleeve and the lower connecting sleeve and transmits the magnetic signal to the signal input module.

11. The AMIM according to claim 4, wherein the signal input module receives wireless communication signals from the signal output module, and controls switching of the electromagnet according to a position of the connecting rod valve.

12. The AMIM according to claim 1, wherein the piston and the shell are sealed with a seal.

13. The AMIM according to claim 1, wherein the shell has a treated inner surface that includes a dextrorotation worm-shaped internal tooth or gear and a levorotation worm-shaped internal tooth or gear.

14. The AMIM according to claim 1, wherein the connecting shaft is coaxial with the spring.

15. The AMIM according to claim 14, wherein the spring is preloaded.

16. The AMIM according to claim 1, wherein the connecting shaft has an outer diameter that is smaller than an inner diameter of the transmission shaft.

17. The AMIM according to claim 1, wherein the transmission shaft shell in the transmission module is axially limited to the power module with the upper TC bearing and the lower TC bearing.

18. The AMIM according to claim 1, wherein the upper and lower TC bearings are axially limited to the transmission shaft shell.

* * * * *